Dec. 5, 1939. W. H. MARSHALL, JR 2,182,747
PRODUCTION OF HYDROGEN BY THE HIGH PRESSURE IRON PROCESS
Filed April 18, 1938
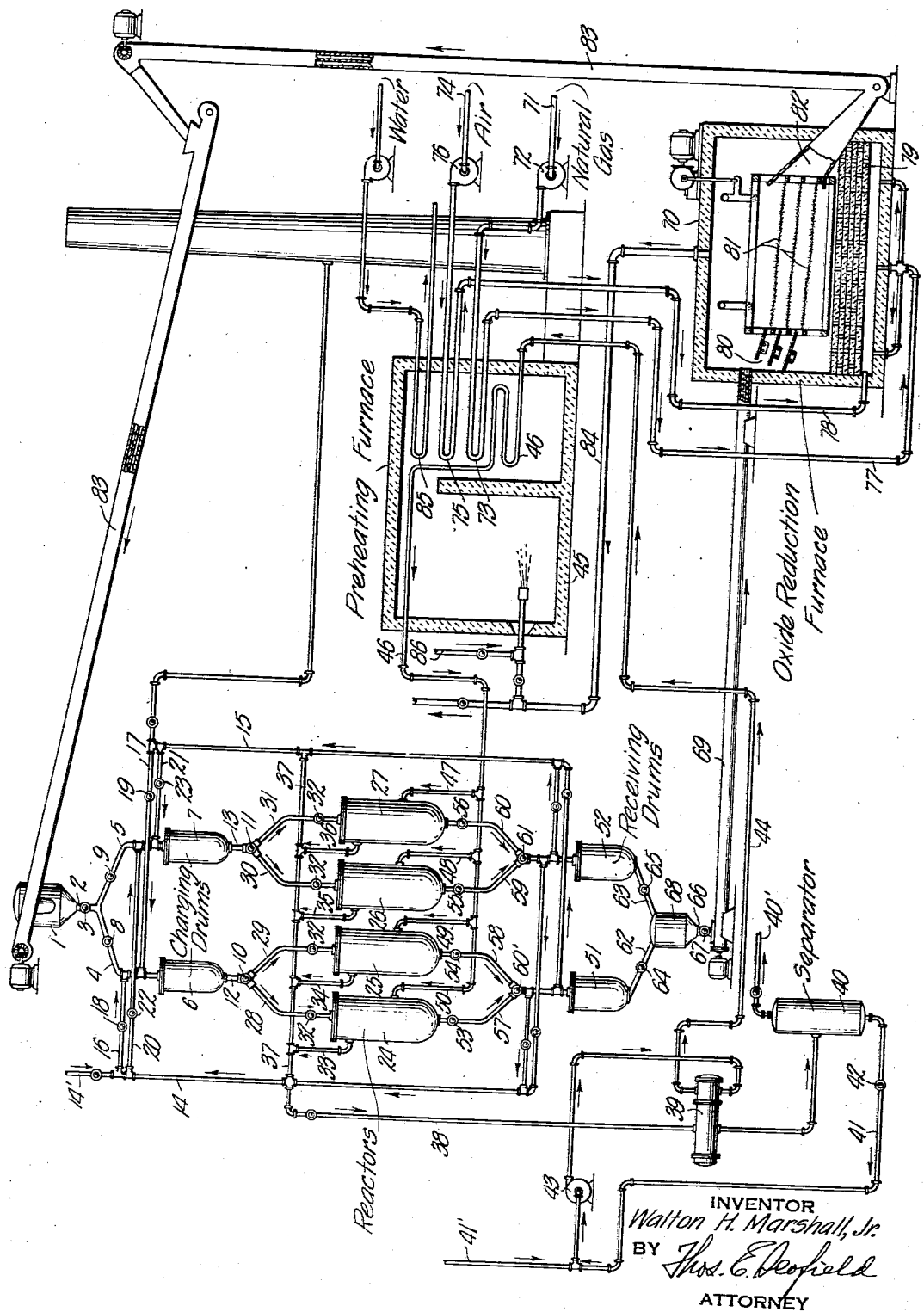
INVENTOR
Walton H. Marshall, Jr.
BY
ATTORNEY Patented Dec. 5, 1939

2,182,747

UNITED STATES PATENT OFFICE 2,182,747

PRODUCTION OF HYDROGEN BY THE HIGH PRESSURE IRON PROCESS

Walton H. Marshall, Jr., Nutley, N. J., assignor to The M. W. Kellogg Company, New York, N. Y., a corporation of Delaware Application April 18, 1938, Serial No. 202,712

8 Claims. (Cl. 23—214)

This invention relates to improvements in the production of hydrogen by the high pressure iron process and refers more particularly to a continuous method of the production of hydrogen in which iron is used in a cycle, being first utilized to convert water and thereafter regenerated in an oxide reduction stage of the process, after which it is recirculated for reuse in the reaction stages.

It is a well known fact that iron will react with liquid water to form iron oxide and hydrogen. Under ordinary conditions, however, the rate of reaction is so slow that hydrogen can not be commercially made in this manner. It is possible, however, by properly controlling conditions to cause the reaction to take place at an economical rate, and two industrial processes for hydrogen manufacture have been attempted. The first process commonly known by the name "Steam Iron" and associated with Messerschmitt, effects the reaction between iron and steam at 1000 to 1300 degrees F. and at atmospheric pressure. The oxidized iron is subsequently reduced with water gas or producer gas and the operation is semi-continuous.

In his researches on hydrogenation, Bergius found that water would react with iron at much lower temperatures such as 500 to 700 degrees F. at pressures sufficiently high as to maintain the water in the liquid state. The rate of reaction was satisfactory and could be increased by the addition of metallic salts, particularly thallium salts, or by the addition of a base metal couple. This latter process has experienced limited industrial application but always in a relatively uneconomical fashion. Finely divided iron in the form of metal turnings or shavings is charged to a pressure vessel which is partially filled with water. The vessel is sealed to hold pressure, heat is applied externally to bring the reactants up to temperature, and the liberated hydrogen is removed as generated.

After reaction has ceased, the contents are dumped and the vessel recharged. Obviously this process is not a particularly economical one since labor costs are high and hydrogen is produced intermittently.

My proposed process is an improvement over the method used by Bergius and others and includes the following features:

1. Hydrogen is generated in the reaction zone at a substantially constant rate.
2. Water is continually added to the reaction zone in order to replace that which has been consumed or removed.
3. Iron is charged to the reaction stage and iron oxide removed therefrom without interrupting the operation.
4. The iron oxide is reduced back to the metal in a separate apparatus.
5. The iron is employed in the form of sized, prefabricated particles which are porous and which contain a metal low in the electromotive series.

The accompanying drawing, which forms part of the instant specification, and which is to be read in conjunction therewith, is a diagrammatic view of one form of apparatus arranged as a flow diagram, and is capable of carrying out the process of the invention.

Metal pellets are supplied to the process from a container or bin 1; they flow by gravity through pipe 2 controlled by valve 3 into lines 4 and 5 connected to charging drums 6 and 7 respectively. These charging drums are sealed by closing valves 8 and 9 as well as the 3-way valves 10 and 11 positioned in the discharge lines 12 and 13.

In starting, the charging drums are filled and hydrogen is admitted through pipe 14' in order to raise the pressure to the point of operation. The hydrogen is supplied through pressuring lines 14 and 15 having auxiliary pipes 16 and 17 regulated by valves 18 and 19 connected to charging pipe 4 and auxiliary lines 20 and 21 controlled by valves 22 and 23 connected to charging pipe 5. When the charging drums are brought up to pressure the solids are permitted to flow into the reaction chambers 24, 25, 26 and 27 through pipes 28, 29, 30 and 31. The flow of solids to the respective reactors is governed by the three-way valves 10 and 11 and additional valves 32 are supplied in the respective charging pipes to maintain pressure. The following chemical reaction takes place in the reactors—

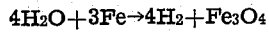
$$4H_2O + 3Fe \rightarrow 4H_2 + Fe_3O_4$$

The hydrogen generated in the reactors, saturated with water vapor, passes from the reactors through pipes 33, 34, 35 and 36 into a common manifold 37. This manifold has connection with the pressuring lines in order that pressure of the reactors can be transferred to the charging drums. The generated hydrogen and water vapor passes from manifold 37 through pipe 38 to heat exchangers diagrammatically shown at 39, where the water vapor is condensed and separated from the hydrogen in separator 40. Hydrogen recovered from the separator 40 through pipe 40' may be returned to the system or used elsewhere.

Process water is removed from the separator through pipe 41 controlled by valve 42 and is recirculated to the suction side of pump 43 to which the process water for the system is supplied through line 41'. The mixture of recirculated and fresh process water is discharged through pipe 43', exchanger 39 and line 44 to preheating furnace 45 where it is passed through coil 46 and brought to the temperature of reaction before being charged to the reactors through transfer line 46. Separate pipes 47, 48, 49 and 50 are connected in to the separate reactors to supply the heated process water thereto.

The iron oxide is dumped into either one of the pressured receiving drums 51 or 52 which are closed off from the reactors by valves 53, 54, 55 and 56 positioned in withdrawal lines 57, 58, 59 and 60. Three-way valves 60 and 61 are interposed in the withdrawal pipes of each pair of reactors to direct the discharge of iron oxide from either one of the pair of reactors to receiving drums 51 and 52. Discharge pipes 62 and 63 regulated by valves 64 and 65 are connected in to the bottom of the receiving drums and direct the iron oxide through pipe 66 controlled by valve 67 to a hopper 68. From the hopper the iron oxide travels through a conveyor 69 to the regeneration unit shown as an oxide reduction furnace at 70.

In the reduction unit the iron oxide is converted back to the metallic state by contact with hot reducing gases. To accomplish the reduction of the iron oxide, natural gas is supplied from any convenient source through pipe 71 and is circulated by blower 72 through heating coil 73 positioned in the preheating furnace 45. In this heating coil it is brought up to temperature to react with air supplied through pipe 74 and circulated through coil 75 also positioned in the preheating furnace by means of the air blower or compressor 76. Discharge pipes 77 and 78 direct the natural gas and heated air to a checker-work brick arrangement 79 positioned in the oxide reduction furnace. Iron oxide supplied by conveyor 69 is introduced into a manifold 80 adjacent the reduction furnace and is spread onto a plurality of inclined vibrating screens shown at 81 over which the pellets of iron oxide travel, to be discharged into a duct 82 and returned by suitable conveying means 83 to the hopper 1. In the oxide reduction furnace iron oxide is converted back to the metallic state through contact with the hot reducing gases generated in the furnace with a combination of the heated air and natural gas. Gas from the furnace is discharged through pipe 84. The following reactions take place in the furnace—

$$Fe_3O_4 + CO \rightarrow 3FeO + CO_2$$
$$FeO + CO \rightarrow Fe + CO_2$$
$$Fe_3O_4 + H_2 \rightarrow 3FeO + H_2O$$
$$FeO + H_2 \rightarrow Fe + H_2O$$

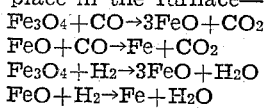

The partially oxidized reducing gas is used as fuel in the preheating furnace. This fuel supply may be augmented through pipe 86. In the same furnace, as explained, the process water as well as the air and natural gas are all heated to suitable temperature. Steam is generated in an economizer coil shown at 85.

The reducing gas for the furnace 81 is manufactured by the partial combustion of methane over catalytic brick-work 79.

The process as shown in the flow diagram represents only one possible method of operation and numerous variations can be made in the arrangement of the reactor, the method of preheating the components for service in the process, and the manner in which the iron is charged to the reactors and withdrawn for regeneration.

Thermodynamically the chemical reaction between iron and water is favored by low temperatures. In actual practice, however, it is necessary to elevate the temperature to a certain extent in order to maintain economical rates. The probable operating range is from 450 to 700 degrees F., and it is believed that approximately 600 degrees F. would be a normal operating temperature. When using freshly regenerated iron, there is the possibility that this material will be sufficiently active as to react at much lower temperatures. Temperatures ranging between atmospheric temperature (say 60 degrees F.) and the critical temperature of water, 705 degrees F., may be used. Any pressure above the vapor pressure of water at the operating temperature may be used. The total or gauge gas pressure within the reaction zone is created by the hydrogen and water vapor generated, and is equal to the partial pressure of hydrogen plus the partial pressure of water vapor. After the desired pressure level has been reached, control will be effected by withdrawing vapors at a rate equal to that at which they are produced. Pressures above atmospheric, particularly in the range of 1,000 to 10,000 lbs. per sq. in. have been found satisfactory. The reaction between iron and water is exothermic, but it is necessary to supply a certain amount of preheat to the entering streams. Either the water or the iron, or both, may be preheated. Reaction temperature will be controlled by the heat content of the entering streams.

The regeneration of the reacted solids is done under very different conditions. The reduction of iron oxide by reducing gases is favored by elevated temperatures. The operating range will be 1000 to 2000 degrees F., and 1500 degrees F. will probably be a good average condition. Pressure is substantially atmospheric. The reduction of iron oxide by hydrogen or carbon monoxide is endothermic, and so the heat of reaction will probably be supplied as sensible heat in the reacting materials, although provision should be made for the application of external heating.

The metallic reactant employed will probably be iron, although any metal having a higher electropositive potential than hydrogen may be employed. The metal can be in the physical shape of dust, powder, or pellets, and a carefully sized material will probably be used. An intermediate screening will prevent the recirculation of materials not having the desired size. It will be desirable to have the metal in a porous condition and probably alloyed with a base metal such as copper, which will act as an electrochemical catalyst. The following method of preparation can be used as an example:

An alloy of 70% iron, 20% aluminum, and 10% copper is formed into small pellets by any practicable means. The aluminum will be dissolved in caustic, leaving the remainder of the metal in a porous state. The copper remains unchanged during the several stages of operation.

If the metal is used as a fine powder it may be possible to introduce it into the reaction space by pumping a water suspension.

It is unnecessary that all of the iron be converted in either the oxidation or reducing step. Partial conversion will simply necessitate a higher rate of recirculation of the solids.

The water pumped into the reaction chamber should contain dissolved salts, such as thallium chloride, in order to increase the electrical conductivity of the liquid medium and thereby increase the reaction rates. The salt would not be lost if no liquid water is withdrawn from the system.

Any mixture of hydrogen and carbon monoxide may be used as the reducing gas. A high concentration of these two components is desirable, but not necessary, in order to lessen the quantities circulated. In the process described methane is partially oxidized by preheated air to produce a reducing gas composed largely of hydrogen, carbon monoxide and nitrogen. Water gas, producer gas, or any similar material could also be used. The reducing gases should enter the reduction furnace at a high temperature, say 2000 degrees F., in order to supply the heat of reaction and to preheat the solid reactants. Refinery gas, natural gas, oils, coal or the like could also be used as a source of reducing agent.

The charging drums and reactors are merely pressure vessels designed to withstand operating conditions and are large enough to handle the quantities circulated. The reactors should be designed for 1 to 4 hours holding time and the charging drums for 5 to 30 minutes holding time. All drums may be lined in order to prevent corrosion or erosion. The dimensions of the reactors may vary considerably, and economic considerations might dictate anything from large vessels to tubes.

The upper valves 10 and 11 will be rotary cocks, not intended to hold any pressure drop, but to initiate or interrupt the flow of solids. The lower valves 32 are designed to hold pressure. These valves will operate in conjunction with each other, the purpose of the cock being to prevent the passage of solids while the lower valve is being opened or closed. One of the outstanding features of this process is that none of the main valves will be opened or closed while any pressure differential exists. The release and application of pressure will be accomplished through pressuring lines.

The reduction furnace contains a number of sloping screens supported on a frame. Solids are fed to the screens at one end and are made to traverse through the furnace by vibrating the supporting framework. The contacting gases pass through the furnace in an opposed direction. The combustion chamber is located in the lower part of the furnace and is packed with crushed brick. This brick has been impregnated with a suitable catalyst, such as reduced nickel.

Several alternates are possible. In the first place the combustion chamber can be a separate piece of equipment. Secondly the reduction can be done in any apparatus in which suitable contact between solids and vapors is obtained. A rotary drum may be used. For the case where powdered iron is employed for the process, the powder may be dropped through a chamber in which the reducing gases are ascending. The powder may also be contacted by blowing it through a suitable length of pipe, the reducing gases being the conveying medium. A stationary bed may also be used, with alternate charging, blasting with reducing gas, and removal of solids.

It will be understood that certain features and sub-combinations are of utility and may be employed without reference to other features and sub-combinations. This is contemplated by and is within the scope of the claim.

It is further obvious that various changes may be made in details within the scope of the claims without departing from the spirit of the invention.

It is therefore to be understood that the invention is not limited to the specific details shown and described.

Having thus described my invention, what I claim is—

1. A method of continuously generating hydrogen including the steps of reacting water in the liquid phase and a finely divided metal capable of reducing water to form hydrogen and the metal oxide at temperatures between 450° F. and 700° F. in a reaction zone, maintaining the reaction zone at a pressure above the vapor pressure of water at the temperature of the reaction, continuously removing the gaseous products from the reaction zone, removing the metal oxide from the reaction zone, supplying fresh finely divided metal to the reaction zone, continuously supplying water to the reaction zone, and recovering hydrogen from said gaseous products.

2. A method as in claim 1 in which said metal oxide removed from the reaction zone is continuously reduced and the reduced metal oxide continuously returned to said reaction zone, maintained under said pressure above the vapor pressure of water at the temperature of the reaction.

3. A method as in claim 1 in which said pressure above the vapor pressure of water at the reaction temperature is between 1000 pounds per square inch and 10,000 pounds per square inch.

4. A method as in claim 1 in which a reducing gas is generated simultaneously with said steps, the metal oxide withdrawn from the reaction zone is continuously subjected to the action of said reducing gas to reduce said metal oxide and the reduced metal oxide is continuously returned to said reaction zone as the fresh, finely divided metal.

5. A method as in claim 1 in which the gaseous products removed from the reaction zone are condensed, the hydrogen separated from the condensate and the condensate returned to said reaction zone as part of the water supplied thereto.

6. A process as in claim 1 in which a hydrocarbon gas is subjected to partial oxidation to generate a reducing gas containing carbon monoxide and hydrogen, said metal oxide is subjected to reduction to the metal by the action of said reducing gas at elevated temperatures, and said reduced metal oxide is continuously returned to said reaction zone as the fresh finely divided metal.

7. A process as in claim 1 in which the finely divided metal comprises iron.

8. A process as in claim 1 in which the finely divided metal comprises an alloy of iron and copper.

WALTON H. MARSHALL, Jr.